Patented June 6, 1950

2,510,834

UNITED STATES PATENT OFFICE 2,510,834

PREPARATION OF NITROCELLULOSE EMULSIONS

Herman C. Phillips, Wilmington, Del., assignor to Hercules Powder Company, Wilmington, Del., a corporation of Delaware No Drawing. Application June 14, 1947, Serial No. 754,777

8 Claims. (Cl. 106—170)

This invention relates to lacquer-in-water emulsions and processes for their preparation. More particularly, it relates to an improved method for the preparation of nitrocellulose emulsions.

Heretofore, nitrocellulose emulsions of the lacquer-in-water type have been prepared by methods which include as the preliminary step the dissolution or "cutting" of the nitrocellulose in a nitrocellulose solvent. It is then required to agitate the nitrocellulose solution with water containing a suitable emulsifying agent for a period of 15 or more minutes to prepare a rough emulsion which can be put through a colloid mill or homogenizer to effect the stabilization thereof.

These methods have several disadvantages. In the first place, the preliminary step of dissolution or "cutting" of the nitrocellulose in a nitrocellulose solvent is time consuming and adds considerably to the cost of the finished product. For example, the "cutting" of nitrocellulose to a homogeneous solution containing 40% or more solids requires 3 hours or more, depending on the particular nitrocellulose content, the type of nitrocellulose used, etc.

In the second place, the resulting nitrocellulose solution or gel, particularly in the case of high solids content, is highly viscous. This makes it very difficult to work the solution with water and to prepare a rough emulsion. Furthermore, there is the possibility during working or subsequent passage through a colloid mill or homogenizer that the emulsion may reverse and form a stiff unusable mass.

In the third place, high solids content emulsions prepared in this manner require a rather large proportion of volatile nitrocellulose solvent to water which is also undesirable from an economic standpoint.

Now, in accordance with this invention, it has been found that equally satisfactory, and in some respects even better, lacquer-in-water emulsions may be prepared by making a slurry of nitrocellulose and water, admixing therewith with agitation a water-immiscible volatile nitrocellulose solvent in the presence of an emulsifying agent until substantially complete colloidization of the nitrocellulose has been effected and a rough lacquer-in-water emulsion has been formed, and homogenizing said rough emulsion or dispersion to effect its stabilization. By the utilization of this novel process, high solids content emulsions of the lacquer-in-water type may be prepared from nitrocellulose in considerably shorter periods of time, as compared with the conventional processes used heretofore.

In operating in accordance with the method of this invention, it is required that a water slurry of the nitrocellulose be prepared and that the colloidization of the nitrocellulose be effected by contacting with agitation the nitrocellulose in the form of such water slurry with either a water-immiscible volatile nitrocellulose solvent, or a water-immiscible solvent-type nitrocellulose plasticizer and a water-immiscible volatile nitrocellulose solvent. Of these two broad modifications of the process, the latter, i. e., contacting the water slurry of nitrocellulose with a water-immiscible solvent-type nitrocellulose plasticizer and a water-immiscible volatile nitrocellulose solvent is preferred.

Whichever of the modifications is employed, it is required that an emulsifying agent be present in the mixture when the aqueous nitrocellulose slurry is being contacted. Agitation is continued until a rough emulsion or dispersion of the lacquer-in-water type results at which point the rough emulsion or dispersion is homogenized to provide a stable emulsion.

Various modified procedures utilizing the principles of the invention set forth hereinabove may be utilized. Thus, one procedure involves a process which comprises (a) preparing a slurry of nitrocellulose in water containing an emulsifying agent, (b) admixing with agitation the slurry and a water-immiscible solvent-type nitrocellulose plasticizer until the nitrocellulose is at least partially colloided, (c) admixing the resulting dispersion with a water-immiscible volatile nitrocellulose solvent with agitation to form a rough lacquer-in-water emulsion, and (d) homogenizing the rough emulsion to form a stable emulsion.

A second procedure is similar to that set forth above with the exception that the nitrocellulose slurry is contacted with an oil-in-water type emulsion having a water-immiscible solvent-type nitrocellulose plasticizer as the dispersed phase.

A third procedure is similar to the second procedure described above with the exception that the emulsion which is contacted with the nitrocellulose slurry contains a water-immiscible volatile nitrocellulose solvent in conjunction with a water-immiscible solvent-type nitrocellulose plasticizer. These two ingredients constitute the dispersed phase of the emulsion which is used to contact the nitrocellulose, thereby colloiding the same.

In a fourth procedure, which in some respects is similar to the third procedure set forth above, the nitrocellulose in the form of a water slurry is contacted by a solution of a water-immiscible solvent-type nitrocellulose plasticizer in a water-immiscible volatile nitrocellulose solvent. Thus, these two ingredients are brought in contact with the nitrocellulose simultaneously as in the third procedure.

A fifth procedure involves a process wherein an oil-in-water type emulsion having a water immiscible solvent-type nitrocellulose plasticizer as the dispersed phase is first prepared and nitrocellulose added thereto. In this manner, the small particles of dispersed plasticizer actually contact the nitrocellulose in the form of a water slurry. After at least partial colloiding of the nitrocellulose is effected, a water-immiscible volatile nitrocellulose solvent is added.

A sixth procedure is representative of the broad but less preferred modification of the invention wherein the only ingredient employed having a solvent effect on the nitrocellulose is a water-immiscible volatile nitrocellulose solvent. In this modification an aqueous nitrocellulose slurry is admixed with agitation with the volatile solvent until substantially complete colloidization of the nitrocellulose has been effected and a rough lacquer-in-water emulsion has been formed, which rough emulsion is then homogenized to form a stable emulsion.

The invention described hereinabove will be illustrated by the following examples which, however, are not to be considered as limiting the invention to the particular conditions employed.

Example 1

This example is a specific embodiment of the invention as described in the first procedure.

A slurry was made up which contained 100 parts of dry ¼ second nitrocellulose and 300 parts of a 0.667% solution of dioctyl sodium sulfo succinate (Aerosol OT) in distilled water, by agitating the ingredients in a high speed mixer for a period of about 3–5 minutes. Two hundred fifty-five parts of air-blown linseed oil (ADM No. 100 Oil) were added to the slurry over a period of 5 minutes, and agitation was continued for 10 minutes. During this period of agitation it could be seen that the linseed oil was replacing the water in the nitrocellulose, and the nitrocellulose became swollen and partially colloided. Then, with continued agitation, 300 parts of butyl acetate and 45 parts of ethyl alcohol were added, and agitation was continued for a period of 30 minutes. At this point, a coarse lacquer-in-water emulsion resulted which was given 3 passes through a Premier colloid mill at clearances of 0.005 inch, 0.0025 inch and 0.0015 inch. An excellent lacquer-in-water emulsion resulted having good stability characteristics and which gave a continuous, flexible, nontacky film when cast on paper.

Example 2

This example is a specific embodiment of the invention as described in the second procedure.

Seventy parts of dry ¼ second nitrocellulose and 175 parts of a 0.5% solution of dioctyl sodium sulfo succinate (Aerosol OT) in distilled water were made up into a slurry using a high speed mixer, employing a mixing time of about 3–5 minutes. At the same time, 178 parts of air-blown linseed oil (ADM No. 100 Oil) were emulsified in 105 parts of a similar aqueous solution containing 0.5% dioctyl sodium sulfo succinate by agitating the ingredients and passing them through a Premier colloid mill. With agitation, the nitrocellulose slurry was added to the emulsion. Upon contacting the nitrocellulose and air-blown linseed oil in this manner, the nitrocellulose could be seen to swell and absorb the linseed oil, thereby displacing water from the fibers. After 15 minutes agitation in a high speed mixer, but before the nitrocellulose was completely colloided, 140 parts of butyl acetate and 32 parts of ethyl alcohol were added and agitation continued for an additional 15 minutes. The resulting dispersion of rough emulsion was passed through a Premier colloid mill 3 times to provide a lacquer-in-water emulsion having desirable stability characteristics. Upon casting this emulsion on paper, continuous, flexible, nontacky films were obtained.

Example 3

This example is a specific embodiment of the invention as described in the third procedure.

A slurry was made up containing 100 parts of dry ¼ second nitrocellulose and 250 parts of a 0.5% solution of dioctyl sodium sulfo succinate (Aerosol OT) in distilled water, employing a high speed mixer. Then, 255 parts of air-blown linseed oil (ADM No. 100 Oil) were emulsified in 150 parts of a 0.5% solution of dioctyl sodium sulfo succinate in distilled water, using a high speed mixer. Two hundred parts of butyl acetate and 45 parts of ethyl alcohol were then added with continued agitation to provide an emulsion containing a solution of the air-blown linseed oil, butyl acetate and ethyl alcohol as the dispersed phase. To this emulsion the aqueous nitrocellulose slurry was added with continuous agitation. Agitation was continued for a period of 15 minutes after all of the slurry had been added to the emulsion. At this point, the nitrocellulose was fully colloided and the ingredients of the mixture were in the form of a dispersion or rough emulsion suitable for homogenizing. This dispersion after 3 passes through a Premier colloid mill gave an excellent lacquer-in-water emulsion having good stability characteristics. The emulsion when cast on paper deposited a nontacky, continuous and flexible film.

Example 4

This example is a specific embodiment of the invention as described in the fourth procedure.

To 60 parts of dry ¼ second nitrocellulose, 150 parts of a 0.5% solution of dioctyl sodium sulfo succinate (Aerosol OT) in distilled water were added and the ingredients agitated in a high speed mixer to form a slurry. A solution comprising 130 parts of air-blown linseed oil (ADM No. 100 Oil), 23 parts of ethyl alcohol and 120 parts of butyl acetate were then added to the aqueous slurry with accompanying agitation. High speed agitation was continued for a period of 1 hour to provide a rough emulsion which upon being passed through a Premier colloid mill at clearances of 0.005 inch, and 0.0025 inch and 0.0015 inch gave a satisfactory emulsion having fair stability characteristics. The emulsion when cast on paper deposited films which were nontacky and continuous.

Example 5

This example is a specific embodiment of the invention as described in the fifth procedure.

An emulsion was made up by slowly pouring 255 parts of air-blown linseed oil (ADM No. 100 Oil) into 167 parts of distilled water containing 2 parts of dioctyl sodium sulfo succinate (Aerosol OT) which was being agitated in a high speed mixer. With accompanying agitation of the emulsion, 333 parts of water-wet ¼ second nitrocellulose (70% water) were added to the emulsion. Agitation was continued for 15 minutes after all of the nitrocellulose had been added, during which period the nitrocellulose became swollen and partially colloided by the air-blown linseed oil. At this point, 300 parts of butyl acetate and 45 parts of ethyl alcohol were slowly added, and agitation then continued for an additional period of 30 minutes. The resulting rough lacquer-in-water emulsion was passed through a Premier colloid mill 3 times to give a very good emulsion having excellent stability characteristics. The emulsion when cast on paper, provided dry, flexible and nontacky films.

*Example 6*

This example is a specific embodiment of the invention as described in the sixth procedure.

A slurry containing 100 parts of dry ¼ second nitrocellulose in 300 parts of a 0.67% solution of dioctyl sodium sulfo succinate (Aerosol OT) in distilled water were prepared using a high speed mixer, then while agitation was continued, 200 parts of butyl acetate were added over a 5 minute period. After the butyl acetate addition is complete, agitation was continued for 5 minutes. The resulting rough lacquer-in-water emulsion was passed through a Premier colloid mill 2 times to stabilize the same. This emulsion when cast on paper deposited clear, continuous, dry films.

*Example 7*

A slurry containing 154 parts of 18–25 cp. nitrocellulose (35% ethyl alcohol) and 246 parts of distilled water containing 2 parts of dioctyl sodium sulfo succinate (Aerosol OT) was made up in a high speed mixer on the basis of an agitation period of 5 minutes. Then, 85 parts of air-blown linseed oil (ADM No. 100 Oil) were slowly added with agitation. Thereafter agitation was continued for 15 minutes. At this point, 300 parts of butyl acetate and 15 parts of ethyl alcohol were added with agitation. The mixture was agitated for 30 minutes after all the air-blown linseed oil had been added. The resulting product was a rough emulsion or dispersion which was passed through a Premier colloid mill 3 times to obtain a highly satisfactory lacquer emulsion. This emulsion was productive of nontacky, flexible, continuous films when cast on paper.

*Example 8*

A slurry was made up containing 100 parts of dry 15–20 second nitrocellulose and 300 parts of 0.667% dioctyl sodium sulfo succinate (Aerosol OT) in distilled water, while agitating with a high speed mixer. Then, 255 parts of air-blown linseed oil (ADM No. 100 Oil) were added. The oil replaced the water in the nitrocellulose and caused the nitrocellulose to swell and become partially colloided. After all the oil was added, agitation was continued for 15 minutes, at the end of which period 400 parts of butyl acetate and 45 parts of ethyl alcohol were added and agitation continued for 1½ hours. The resulting rough emulsion was given 3 passes through a Premier colloid mill, the product being an excellent lacquer-in-water emulsion which gave a continuous, nontacky film when cast on paper.

*Example 9*

A slurry was made up containing 100 parts of dry ¼ second nitrocellulose and 300 parts of a solution containing 1.5 parts of sodium lauryl sulfate (Duponol ME), 3.0 parts of sulfonated castor oil and 295.5 parts of distilled water, employing agitation with a high speed mixer. Then, 255 parts of air-blown linseed oil (ADM No. 100 Oil) were added slowly with agitation and agitation continued for a period of 15 minutes. At the end of this period, 300 parts of butyl acetate and 45 parts of ethyl alcohol were added and agitation continued for 45 minutes. The resultant lacquer-in-water rough emulsion was passed 3 times through a Premier colloid mill, the resulting product being a highly stable emulsion which when cast on paper gave continuous, nontacky, flexible films.

*Example 10*

A slurry was made up using 100 parts of dry ¼ second nitrocellulose and 300 parts of a 0.667% solution of dioctyl sodium sulfo succinate (Aerosol OT) in distilled water, employing a high speed mixer. As a solvent-type plasticizer, 200 parts of dibutyl phthalate were then added slowly with agitation. Agitation was continued for 20 minutes at the end of which period 300 parts of butyl acetate were added with agitation. Thereafter, agitation was continued for another 40 minute period. The resultant dispersion was given 3 passes through a Premier colloid mill to provide an excellent stable lacquer-in-water emulsion.

*Example 11*

A slurry was made up containing 1 part of dry 15–20 second nitrocellulose and 3 parts of 0.667% dioctyl sodium sulfo succinate (Aerosol OT) in distilled water, while agitating with a high speed mixer. Then 0.5 part dibutyl phthalate and 1 part raw castor oil were added slowly with agitation and agitation continued for about 15 minutes. Then 4 parts methyl isobutyl ketone and 0.4 part ethyl alcohol were added and agitation continued for 1½ hours. The resulting rough emulsion was given 3 passes through a Premier colloid mill and then filtered through cheesecloth to provide an excellent stable lacquer-in-water emulsion.

*Example 12*

An emulsion was prepared as in Example 11 containing 1 part of dry 15–20 second nitrocellulose, 3 parts of 0.667% dioctyl sodium sulfo succinate (Aerosol OT) in distilled water, 1 part tricresyl phosphate, 4 parts diisobutyl ketone and 0.4 part ethyl alcohol. The resulting product was an excellent stable lacquer-in-water emulsion.

As illustrated by the examples, the nitrocellulose employed in accordance with this invention may be in dry form, wet with water, or wet with ethyl or other alcohols in which form the material is often supplied commercially. Nitrocellulose of substantially any desired viscosity characteristic may be employed, depending upon the use for which the ultimate emulsion is intended. Thus, by way of example, emulsions made in accordance with this invention may contain nitrocellulose of low viscosity characteristic, for example, 18–25 cps., 30–35 cps., ¼ second or ½ second, or nitrocellulose of relatively high viscosity, for example, from ½ to 80 seconds, or higher if desired. It will be understood that the viscosity characteristics referred to are those determined by the Standard Hercules Falling Ball Method published in the Hercules Nitrocellulose Handbook, 1939 edition, which method is essentially the same as A. S. T. M. Specification D301—33.

Various dispersing or emulsifying agents may be used so long as the dispersing or emulsifying agent is soluble in water, is free of electrolytes, is present in the quantity necessary to be used, will not segregate from and will form an integral part of or a single phase with the dried nitrocellulose film or coating, and will not react with the nitrocellulose to render the film unsuitable for such purposes as it is intended. Dioctyl sodium sulfo succinate (Aerosol OT) has been found to be particularly useful in connection with the subject processes. Other useful dispersing or emulsifying agents, for example, sodium, potassium, lithium, etc., salts of the higher aliphatic sulfates, preferably containing 8 or more carbon atoms, such as, for example, sodium oleyl sulfate, sodium lauryl sulfate, sodium stearyl sulfate, sodium myristyl sulfate, sodium cetyl sulfate, etc.; sulfonated castor oil, sodium oleate, casein, etc., may be employed. Certain mixtures of various dispersing or emulsifying agents have also been found to be particularly effective, for example, a mixture of sulfonated castor oil and sodium lauryl sulfate. A very small amount of the sodium salt of carboxymethylcellulose, for example, not more than 0.5% based on the aqueous phase, may be employed in preparing the subject emulsions as a protective colloid to improve the aging characteristics of the emulsions.

In accordance with the preferred modification of this invention a water-immiscible solvent-type nitrocellulose plasticizer is essential. Linseed oil, air-blown at low temperatures, for example, 50° C., until it becomes a solvent-type plasticizer for nirtocellulose, is particularly effective. A commercial product of this type is "ADM No. 100 Oil" made by the Archer Daniels Midland Company. Other solvent-type plasticizers which may be employed are, for example, diamyl phthalate, dibutyl phthalate, dibutyl tartrate, diethyl phthalate, dioctyl phthalate, tricresyl phosphate, triphenyl phosphate, air-blown castor oil, butyl acetyl ricinoleate, etc. It will be understood that nonsolvent-type plasticizers, as linseed oil, castor oil, soybean oil, tung oil, etc., may be employed in minor quantities in conjunction with the above-mentioned solvent-type plasticizers in carrying out the preferred modification of the invention wherein nitrocellulose in the form of an aqueous slurry is contacted with a water-immiscible solvent-type plasticizer. Similarly, the nonsolvent-type plasticizers may be used in carrying out the modification of the invention wherein the aqueous slurry of nitrocellulose is contacted with a water-immiscible volatile nitrocellulose solvent. For example, they may be incorporated in the volatile solvent before contacting the same with the nitrocellulose in aqueous slurry form, or they may be added later.

Gums, resins, natural or synthetic, such as dammar gum, methyl or ethyl abietate, oil-modified glycerol phthalates, ester gum, etc., may be employed as nonvolatile ingredients of the lacquer phase but are in no way essential. If gums or resins are employed they are desirably added in the form of a solution in a suitable solvent. Various pigments, such as titanium dioxide, antimony trioxide, carbon black, etc., or dyes heretofore used in lacquers may be employed.

It is essential to the successful carrying out of the processes described herein to employ a volatile nitrocellulose solvent. Various solvents or solvent mixtures for the nitrocellulose may be employed so long as the solvent or solvent mixture is of such a character as to permit emulsification of the nitrocellulose solution in water without precipitation of the nitrocellulose. The particular solvent or solvent mixture employed must, of course, be substantially immiscible with water. As illustrative of the solvents which may be satisfactorily employed in adapting this invention to practice, for example, hexyl acetate, octyl acetate, butyl acetate, butyl butyrate, butyl propionate, amyl acetate, beta-chlorethyl acetate, cyclohexyl acetate, ethyl benzoate, methyl isobutyl ketone, diisobutyl ketone, etc., may be employed. Various diluents miscible with the nitrocellulose solvent but substantially immiscible with water may be employed, such as xylol, toluol, butyl alcohol, etc.

In preparing nitrocellulose lacquer emulsions in accordance with the method of this invention, the proportion by weight of the lacquer phase to the water phase should be at least about 1.5:1.0. This condition must generally be satisfied in order to provide emulsions having sufficient stability to be useful in the coating or impregnating applications to which the emulsions are put. Furthermore, such minimum proportion of lacquer phase to water phase is required to provide an emulsion having sufficient nonvolatile solids content to provide a continuous film upon evaporation of the volatile constituents if the emulsion is used as a film-forming agent, or to provide uniform impregnation in the event the emulsion is used as an impregnant. It is preferred, moreover, to use a proportion of lacquer phase to water phase of from about 1.5:1.0 to about 3.0:1.0. It is essential that sufficient water be used in any case to provide a lacquer-in-water type emulsion.

With particular regard to the water phase of the emulsions prepared in accordance with this invention, it will be understood that it is only required that sufficient emulsifying or dispersing agent or agents be present to provide a stable emulsion. The amount required to give this result will vary considerably depending upon the particular agent or agents employed. On the basis of practical experience, however, it has been found that between about 0.5% and about 2.0% emulsifying agent on the basis of the water phase is required to provide the desired stability.

With particular regard to the lacquer phase of the emulsions prepared in accordance with this invention, it will be understood from what has been said heretofore and from the illustrative embodiments of the invention that nitrocellulose and a water-immiscible volatile nitrocellulose solvent are essential ingredients and that in the preferred modification of the invention a water-immiscible solvent-type nitrocellulose plasticizer is also essential. As for the nitrocellulose, it may be employed in varying amounts, the particular amount employed in any specific instance being dependent upon the desired characteristics of the ultimate film or impregnation. Generally speaking, however, the lacquer or dispersed phase will contain from about 5% to about 50% nitrocellulose.

Operating in accordance with the preferred modification of this invention, it is desirable to employ at least about 15% water-immiscible solvent-type plasticizer on the basis of the nitrocellulose. Preferably, between about 40% and about 75% solvent-type plasticizer will be employed on the basis of the nitrocellulose. By contacting the solvent-type plasticizer with the nitrocellulose while water-wet in the form of a slurry, the formation of stable emulsions can be effected in much shorter time than has been possible heretofore.

It is furthermore essential, in operating in accordance with the preferred modification of this invention, that a water-immiscible volatile nitrocellulose solvent be employed in such an amount as to provide a rough emulsion or dispersion of a fully colloided nitrocellulose in water which can be homogenized by passage through a colloid mill or homogenizing valve. Thus, while it is essential that a volatile nitrocellulose solvent be employed, the extent to which it is used will vary widely and the amount used in any particular instance will depend on several factors such as the amount of nitrocellulose and the amount of solvent-type nitrocellulose plasticizer. There is, of course, a maximum limit to the amount of solvent-type plasticizer which can be employed in any formulation to avoid tackiness of the resulting lacquer films or impregnations. There is also a certain minimum amount of volatile nitrocellulose solvent which must be employed in any such specific instance to provide a uniformly colloided and dispersed nitrocellulose and to lower the viscosity of the nitrocellulose solution which constitutes the lacquer phase to such an extent as to provide a rough dispersion capable of homogenization. Practical experience has shown that from about 30% to about 70% water-immiscible volatile nitrocellulose solvent should be employed on the basis of the lacquer phase; however, as indicated, the invention is not limited to the use of such amounts of nitrocellulose solvent.

When operating in accordance with the less preferred modification of the invention, i. e., when an aqueous slurry of nitrocellulose is contacted with a water-immiscible volatile nitrocellulose solvent in the absence of a solvent-type plasticizer, substantially larger amounts of volatile nitrocellulose solvent will be employed. The amount employed in any instance will be governed by the amount of nitrocellulose employed and will be sufficient to dissolve the nitrocellulose and to permit the formation of a rough lacquer-in-water emulsion capable of homogenization to a stable emulsion.

As has been heretofore explained, it is necessary that the nitrocellulose at some point in the process be in the form of an aqueous slurry. Any simple mixing device can be employed, with high speed agitation, for example, agitation with a Lightnin mixer, being most efficacious. If desired, a pebble mill may be used, however, its use requires somewhat longer periods of operation to be effective.

In operating in accordance with the preferred modification of this invention, a desirable method involves the preparation of an aqueous slurry of the nitrocellulose and slow addition of the solvent-type plasticizer thereto with agitation, as illustrated by Example 1. However, it is only essential, in accordance with the broad principle hereof, to contact the solvent-type plasticizer with the nitrocellulose while in the form of an aqueous slurry. Thus, as illustrated by Example 5, the solvent-type plasticizer may be emulsified and the nitrocellulose, preferably water-wet, added to the resulting emulsion with agitation. Under these conditions it is clear that the emulsified droplets of plasticizer are contacting the nitrocellulose while it is in the form of a water slurry.

When operating on the basis of first forming a water slurry of the nitrocellulose, it is possible to contact the nitrocellulose with solvent-type plasticizer by directly adding the plasticizer per se, adding it in the form of an emulsified solution of plasticizer and volatile nitrocellulose solvent or adding it in the form of merely a solution of plasticizer in a volatile nitrocellulose solvent. Of these various methods, the first, i. e., adding the solvent-type plasticizer per se, is the preferred one inasmuch as its use is productive of excellent, very uniform results.

As exemplified by the examples the contacting of the water slurry of nitrocellulose and the water-immiscible nitrocellulose solvent or water-immiscible nitrocellulose solvent and solvent-type plasticizer is carried out with agitation. It is essential that agitation be continued until the complete colloidization of the nitrocellulose has been effected and a dispersion or rough emulsion results which can be put through a colloid mill or homogenizing valve to provide a stable emulsion.

If, in operating in accordance with the preferred modification of the invention, an aqueous slurry of nitrocellulose is contacted with a solvent-type plasticizer per se, the agitation need not be continued until complete colloidization of the nitrocellulose has been effected. It is sufficient to complete the colloidization after the volatile nitrocellulose solvent has been added. Regardless of whether the plasticizer is used per se to contact the nitrocellulose or whether it is combined with the volatile solvent prior to contacting the nitrocellulose, the total mixing time required (to provide a fully colloided nitrocellulose in the form of a dispersion or rough emulsion suitable for homogenization) is usually within the range of from about 15 minutes to about 45 minutes.

It is important to realize in preparing emulsions by the novel method herein described that, once the aqueous slurry of nitrocellulose is contacted with a water-immiscible nitrocellulose solvent, the ingredients must be agitated substantially continuously throughout the remainder of the process leading to the formation of the dispersion or rough emulsion. If this is not done, gel particles are likely to form which cannot be redispersed.

The advantages inhering in the practice of the present invention are many and important. The common method for preparing lacquer emulsions required 3 hours or more, depending on the formulation, to "cut" the nitrocellulose to a lacquer solution which can be emulsified with water. Once the lacquer has been prepared, the step of forming a rough emulsion prior to homogenization is also time consuming. The novel method provided herewith is unique and of great practical merit since the time involved in reaching the rough emulsion or dispersion stage is cut down to about 1 hour or less when operating in accordance with the preferred modification of the invention. Regardless of which particular modification is employed, the utilization of the principles of the invention provides a substantial decrease in the amount of time required to manufacture stable nitrocellulose lacquer emulsions. Such a substantial decrease in the operating cycle increases the capacity of a plant of a given size and provides economy of manufacture. No special equipment except that normally used in preparing emulsions is required.

A further advantage of the new process lies in the fact that the emulsions resulting therefrom have somewhat lower viscosities as compared with emulsions prepared on the basis of identical formulations but using the usual method of preparation. Thus, emulsions containing higher solids can be obtained at useful viscosities. All the emulsions of this invention are of the lacquer-in-water type throughout the course of their preparation.

As compared with nitrocellulose lacquers, the emulsions prepared in accordance with the invention are distinctly advantageous since they can be made from water-wet nitrocotton, as well as the alcohol-wet and dry varieties. Thus, water-wet nitrocellulose, containing about 70% water, can be taken directly from a nitrocotton line and made up into highly useful coating and impregnating compositions. In this manner, expensive commercial methods employed for dehydrating nitrocellulose can be eliminated.

Wherever percentage and proportion figures are given in this application, they are on a weight basis unless specifically stated to be otherwise.

What I claim and desire to protect by Letters Patent is:

1. The process of preparing a lacquer-in-water emulsion which comprises agitating a water slurry comprising nitrocellulose, sufficient water to form a slurry and a water-soluble emulsifying agent with a water-immiscible volatile nitrocellulose solvent to substantially completely colloid the nitrocellulose and to form a rough lacquer-in-water emulsion, and homogenizing said rough emulsion to form a stable emulsion.

2. The process of preparing a lacquer-in-water emulsion which comprises agitating a water slurry comprising nitrocellulose, sufficient water to form a slurry and a water-soluble emulsifying agent with a water-immiscible nitrocellulose solvent plasticizer and a water-immiscible volatile nitrocellulose solvent to substantially completely colloid the nitrocellulose and to form a rough lacquer-in-water emulsion, and homogenizing said rough emulsion to form a stable emulsion.

3. The process of preparing a lacquer-in-water emulsion which comprises preparing a slurry of nitrocellulose in water containing a water-soluble emulsifying agent, agitating said slurry with a water-immiscible nitrocellulose solvent plasticizer and a water-immiscible volatile nitrocellulose solvent to substantially completely colloid the nitrocellulose and to form a rough lacquer-in-water emulsion, and homogenizing said rough emulsion to form a stable emulsion.

4. The process of preparing a lacquer-in-water emulsion which comprises preparing a slurry of nitrocellulose in water containing a water-soluble emulsifying agent, agitating said slurry with a water-immiscible nitrocellulose solvent plasticizer to partially colloid the nitrocellulose and to maintain a slurry mixture, agitating said slurry mixture with a water-immiscible volatile nitrocellulose solvent to substantially completely colloid the nitrocellulose and to form a rough lacquer-in-water emulsion, and homogenizing said rough emulsion to form a stable emulsion.

5. The process of preparing a lacquer-in-water emulsion which comprises preparing a slurry of nitrocellulose in water containing a water-soluble emulsifying agent, agitating said slurry with an emulsion of a water-immiscible nitrocellulose solvent plasticizer in water to partially colloid the nitrocellulose and to maintain a slurry mixture, agitating said slurry mixture with a water-immiscible volatile nitrocellulose solvent to substantially completely colloid the nitrocellulose and to form a rough lacquer-in-water emulsion, and homogenizing said rough emulsion to form a stable emulsion.

6. The process of preparing a lacquer-in-water emulsion which comprises preparing a slurry of nitrocellulose in water containing a water-soluble emulsifying agent, agitating said slurry with an emulsion of a water-immiscible nitrocellulose solvent plasticizer and a water-immiscible volatile nitrocellulose solvent in water to substantially completely colloid the nitrocellulose and to form a rough lacquer-in-water emulsion, and homogenizing said rough emulsion to form a stable emulsion.

7. The process of preparing a lacquer-in-water emulsion which comprises preparing a slurry of nitrocellulose in water containing a water-soluble emulsifying agent, agitating said slurry with a solution of a water-immiscible nitrocellulose solvent plasticizer in a water-immiscible volatile nitrocellulose solvent to substantially completely colloid the nitrocellulose and to form a rough lacquer-in-water emulsion, and homogenizing said rough emulsion to form a stable emulsion.

8. The process of preparing a lacquer-in-water emulsion which comprises preparing a nitrocellulose slurry by mixing nitrocellulose with an emulsion of a water-immiscible nitrocellulose solvent plasticizer in water containing a water-soluble emulsifying agent, agitating said slurry to partially colloid the nitrocellulose and to maintain a slurry mixture, agitating said slurry mixture with a water-immiscible volatile nitrocellulose solvent to substantially completely colloid the nitrocellulose and to form a rough lacquer-in-water emulsion, and homogenizing said rough emulsion to form a stable emulsion.

HERMAN C. PHILLIPS.

REFERENCES CITED

The following references are of record in the file of this patent:

UNITED STATES PATENTS

| Number | Name | Date |
| --- | --- | --- |
| 1,970,572 | Murray | Aug. 21, 1934 |
| 2,140,745 | Hucks | Dec. 20, 1938 |

FOREIGN PATENTS

| Number | Country | Date |
| --- | --- | --- |
| 23,003 | Australia | Apr. 15, 1930 |
| 116,315 | Australia | Dec. 6, 1939 |
| 351,444 | Great Britain | June 19, 1931 |
| 477,997 | Great Britain | Jan. 10, 1938 |
| 528,069 | Great Britain | Oct. 22, 1940 |
| 558,296 | Great Britain | Dec. 30, 1943 |